United States Patent [19]

Arnold et al.

[11] Patent Number: 5,200,526
[45] Date of Patent: Apr. 6, 1993

[54] SYNTHESES OF OPTICALLY PURE α-AMINO ACIDS FROM 3-AMINO-2-OXETANONE SALTS

[75] Inventors: Lee D. Arnold, Streetsville; John C. Vederas, Edmonton, both of Canada

[73] Assignee: The Governors of the University of Alberta, Edmonton, Canada

[21] Appl. No.: 601,371

[22] Filed: Oct. 23, 1990

Related U.S. Application Data

[63] Continuation of Ser. No. 189,405, Apr. 27, 1988, abandoned.

[30] Foreign Application Priority Data

Apr. 27, 1987 [GB] United Kingdom ............... 8709888

[51] Int. Cl.$^5$ .................. C07D 231/10; C07D 305/04
[52] U.S. Cl. ............................. 548/375.1; 549/328; 562/554; 562/401; 562/433; 562/444
[58] Field of Search ............... 549/328, 510; 548/378; 562/554, 401, 433

[56] References Cited

U.S. PATENT DOCUMENTS

| | | | |
|---|---|---|---|
| 3,769,271 | 10/1973 | Southard | 203/53 |
| 4,275,217 | 6/1981 | Duhamel et al. | 548/344 |
| 4,350,637 | 9/1982 | Martel et al. | 549/304 |
| 4,370,493 | 1/1983 | Davis, Jr. | 562/444 |
| 4,371,705 | 2/1983 | Davis, Jr. | 562/444 |
| 4,375,555 | 9/1983 | Davis, Jr. | 562/444 |
| 4,427,827 | 1/1984 | Stevenson | 525/54.11 |
| 4,581,168 | 4/1986 | Diaz et al. | 530/324 |

OTHER PUBLICATIONS

Sheehan, et al. (1959), J. Am. Chem. Soc. 81:6086.
Arnold, et al. (1985), J. Am. Chem. Soc., 107:7105-9.
Ramer, et al. (1986), Can. J. Chem. 64:706-13.
Arnold, et al. (1987), J. Am. Chem. Soc., 109:4649-59.
Arnold, et al. (1988), J. Am. Chem. Soc., 110:2237-41.

*Primary Examiner*—Mary C. Lee
*Assistant Examiner*—Joseph K. McKane
*Attorney, Agent, or Firm*—Banner, Birch, McKie & Beckett

[57] ABSTRACT

A process for the preparation of optically pure α-amino acids comprising the nucleophilic ring-opening of 3-amino-2-oxetanone salts. N-Protected serine β-lactones are deprotected to form heretofore unknown 3-amino-2-oxetanone and its corresponding salts. In turn these previously unknown 3-amino-2-oxetanone salts may be used in the synthesis of other novel or rare stereochemically-pure free amino acids.

40 Claims, No Drawings

SYNTHESES OF OPTICALLY PURE α-AMINO ACIDS FROM 3-AMINO-2-OXETANONE SALTS

This application is a continuation, of application Ser. No. 189,405, filed Apr. 27, 1988, now abandoned.

FIELD OF THE INVENTION

This invention relates to the syntheses of amino acids and more particularly the syntheses of optically pure α-amino acids from 3-amino-2-oxetanone salts.

BACKGROUND OF THE INVENTION

Over 700 naturally occurring α-amino acids have been discovered in nature and many more have been produced synthetically. Virtually all of them have some biological importance. Amino acids and their derivatives are increasingly being employed as chiral synthons, catalysts and auxiliaries in asymmetric syntheses. Since relatively few (2 to 3%) of the known amino acids occur abundantly in nature, most recent work has focused on their synthetic production in optically-active form. Currently, general methods for syntheses of amino acids often suffer from lack of stereochemical control, poor yields or numerous steps. Since both enantiomers of the proteinogenic amino acids serine are available at relatively low expense, they are especially attractive chiral synthons for other rare or unusual amino acids.

The 20 common (2S)-L-α-amino acids play a central role in the primary metabolism of all living organisms. A vast majority of the remaining naturally-occurring non-protein amino acids are generated by various plants and lower organisms as secondary metabolites, products of detoxification of foreign compounds, or as defense mechanisms against predators or competitors. Either free or as constituents in peptides or depsipeptides, the non-protein amino acids are responsible for an incredible spectrum of biological activities.

Pharmacologically the most important of these activities are their action as antibiotic and antitumor agents and as antimetabolites and hormone analogues for the treatments of various diseases. As a result, natural non-protein amino acids and their almost innumerable synthetic modifications function as important components in many drugs and pharmaceuticals. Importantly, all of the α-amino acids produced in nature are enantiomerically pure, and often each enantiomer displays a specific biological activity. In addition, with the emergence of peptide syntheses as a powerful tool in molecular biology there is an ever-increasing demand for a wide range of amino acids with high optical purity. Among other things one intention of this invention is to produce synthetically α-amino acids which are enantiomerically pure.

INTRODUCTION TO THE INVENTION

Proteinogenic amino acids such as serine are readily available starting materials for the synthesis of other new, rare or unusual amino acids. Commercially available N-protected serine derivatives may be lactonized in high yield (70–81%) to form N-protected serine β-lactones using modified Mitsunobu reaction conditions. Suitable Mitsunobu reaction conditions are described in "Conversion of Serine to Stereochemically Pure β-Substituted α-Amino Acids via β-Lactones" (Arnold, L. D., Kalantar, T. J. and Vederas, J. C., *J. Am. Chem. Soc.* (1985) Vol. 107, at pp 7105–7109) and in "Conversion of Serine β-Lactones to Chiral α-Amino Acids by Copper-Containing organolithium and Organomagnesium Reagents" (Arnold, L. D., Drover, J. C. G., Vederas, J. C., *J. Am. Chem. Soc.* (1987) Vol. 109, at pp. 4649–4659). Mitsunobu cyclization can be further facilitated through the use of an azodicarboxylate polymer resin as disclosed in a copending application entitled "Polymer-Supported Alkyl Azodicarboxylates and their use in Mitsunobu Reactions."

The ready availability of N-protected serine β-lactones renders them an eminently suitable starting material for the synthesis of other amino acids and in the creation of new amino acids. Such syntheses could occur in two ways: directly from the N-protected serine β-lactones to form other N-protected amino acids; or indirectly via an intermediary or intermediaries. N-protected serine β-lactones react with oxygen, nitrogen, sulfur, halogen, phosphorous, and carbon nucleophiles to provide direct access to many N-protected optically-pure amino acid derivatives. The available carbon nucleophiles include cyanide, diazomethane, malonate, copper-containing organolithium reagents and copper-containing organomagnesium reagents. A discussion of the mechanisms for direct synthesis can be found in the articles by Arnold, Kalantar and Vederas, and Arnold, Drover, and Vederas, which were cited above. Indirect synthesis via deprotection of N-protected amino acids allows the formation of free amino acids in near quantitative yield. However some functionalities in the amino acid side-chain will not withstand typical deprotection methods.

Through the use of 3-amino-2-oxetanone salts, the present invention allows the syntheses of amino acids whose substituents would not otherwise withstand the usual deprotection methods and also which have not been previously synthesized. With adequate nucleophiles extremely high yields of free amino acids can be obtained. Chemoselectivity in aqueous solvent systems can be attained through control of pH despite the fact that 3-amino-2-oxetanone salts can hydrolyze quite rapidly in water. Even relatively poor nucleophiles give excellent yields of products.

In contrast to their β-lactam counterparts (3-aminoazetidinones) which may be N-acylated under aqueous or non-aqueous conditions, the unprotected serine β-lactones easily add even the poorest of nucleophiles (eg., $CF_3COO^{31}$, $TsO^-$) to produce the corresponding stereochemically-pure free amino acids in high yield. The nucleophile used will determine the amino acid generated since the nucleophilic reagent will contain the appropriate amino acid side-group determinant.

Among the amino acids synthesized are natural non-protein amino acids, constituents of antitumor/antibiotic peptides and secretory proteins, enzyme inhibitors, neurotoxins, mutagenic amino acids, and analogs of metabolic amino acids. An example of a useful natural amino acid synthesized in accordance with this invention is thialysine. Thialysine is produced naturally in mushrooms and acts as a lysine antimetabolite in biological systems. The method also provides a convenient route for conversion of inexpensive D-serine into rarer D-amino acids via the D-serine β-lactones. The convenience and synthetic versatility of the 3-amino-2-oxetanone salts gives rise to numerous potential applications in organic syntheses, biochemistry and the pharmaceutical industry.

SUMMARY OF THE INVENTION

In accordance with an aspect of this invention, N-protected serine β-lactones are used in the synthesis of protected, enantiomerically pure amino acids. Some of the amino acids generated through this invention are novel compounds while other amino acids formed have been accessible only through natural sources. In their natural state, these latter amino acids are very rare and therefore synthetic mechanisms for their production are welcomed.

In accordance with an aspect of this invention the N-protected serine β-lactones are deprotected to form heretofore unknown 3-amino-2-oxetanone salts. In turn these previously unknown 3-amino-2-oxetanone salts are used in the synthesis of other novel or rare unprotected amino acids.

In accordance with an aspect of this invention, N-(tert-butoxycarbonyl)serine β-lactones are readily deprotected under mild acidic conditions to yield 3-amino-2-oxetanone salts. The unprotected β-lactone may be isolated, characterized, recrystallized and stored as a stable salt of para-toluenesulfonic acid which is precipitated from the reaction by addition of ether. Alternatively, the trifluoroacetate salt may be obtained by removal of the $CF_3COOH$ solvent, and used immediately in subsequent reactions Both salts react equally well with a wide variety of carbon, nitrogen, oxygen, sulfur and halogen nucleophiles to produce stereochemically-pure free amino acids in high yield.

According to an aspect of the invention, optically-pure α-amino acids of the formula:

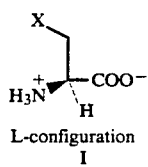

L-configuration
I or

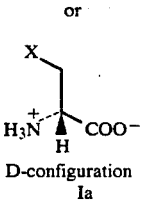

D-configuration
Ia wherein X is the amino acid side-group determinant, are prepared using a process comprising the nucleophilic ring-opening of a 3-amino-2-oxetanone salt of the formula:

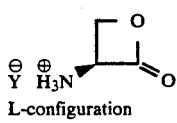

L-configuration
II or

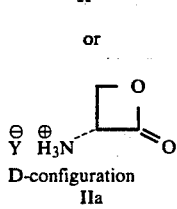

D-configuration
IIa wherein $Y^-$ is a suitable salt anion, with the nucleophilic ring-opening occurring in the presence of a nucleophilic reagent bearing the X side-group determinant.

According to another aspect of the invention, 3-amino-2-oxetanone salts of the formula

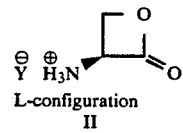

L-configuration
II or

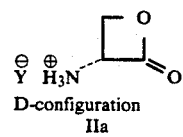

D-configuration
IIa wherein $Y^-$ is a suitable salt anion, are prepared by deprotecting N-protected serine β-lactones of the formula:

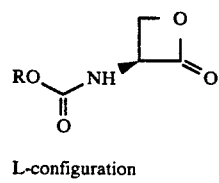

III

L-configuration or

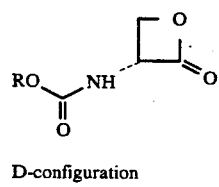

IIIa

D-configuration wherein R is a suitable protecting group with the deprotection occurring in the presence of a suitable acid of the formula HY which is capable of deprotecting a compound of formula III.

According to another aspect of this invention, the compound 3-amino-2-oxetanone is new and previously unknown. According to another aspect of this invention all 3-amino-2-oxetanone salts are new and previously unknown.

According to another aspect of this invention, the tosylate and trifluoroacetate salts of 3-amino-2-oxetanone are new and previously unknown.

DETAILED DESCRIPTION OF THE INVENTION

The principal of synthesizing optically-pure α-amino acids and 3-amino-2-oxetanone salts is demonstrated in accordance with the following preferred embodiments of the invention.

Although deprotection of the N-protected derivatives generated by nucleophilic ring-openings of BOC-,CBZ- or N,N-CBZ-Bn-serine β-lactones will produce many free amino acids in near quantitative yield, some side-chain functionalities (eg., $-N_3$) cannot withstand typical deprotection methods. In accordance with a preferred aspect of this invention BOC-protected serine β-lactones are deprotected to produce stable 3-amino-2-oxetanone salts, which in turn, can then be used as reactants in the production of other novel, rare or unusual unprotected amino acids.

The N-(tert-butoxycarbonyl)serine β-lactones are easily accessible. Modified Mitsunobu reaction conditions (Ph$_3$P, dialkyl azodicarboxylate, −78° C.) readily cyclize the L- or D-antipodes of BOC-serine to the corresponding BOC-serine β-lactones without detectable epimerization. The abbreviation BOC is a common abbreviation for N-(tert-butoxycarbonyl).

Treatment of the BOC-L-serine β-lactone with anhydrous trifluoroacetic acid (TFA) produces 3-amino-2-oxetanone trifluoroacetate in nearly quantitative yield. Removal of excess trifluoroacetic acid (TFA) and tert-butyl trifluoroacetate in vacuo gives material which is best used immediately in subsequent reactions since traces of other salts and residual acid can cause decomposition. However, addition of one equivalent of p-toluenesulfonic acid to the deprotection reaction affords the tosylate salt having the nomenclature (S)3-amino-2-oxetanone, p-toluenesulfonic acid salt. This tosylate salt is easily isolated, recrystallized and stored dry indefinitely. The enantiomeric (R)-3-amino-2-oxetanone salts can be prepared analogously from BOC-D-serine β-lactone.

In the absence of impurities, the TFA salt of 3-amino-2-oxetanone is stable for over 1 week in CF$_3$COOH, however if impurities are present O-trifluoroacetyl serine rapidly forms. For this reason the trifluoracetate salt of 3-amino-2-oxetanone is usually generated and used immediately. Because it is difficult to liberate 3-amino-2-oxetanone of all the residual CF$_3$COOH and CF$_3$COO$^t$Bu, it is usually employed under aqueous conditions with controlled pH or with an excess of nucleophile.

Isolation of (3R) or (3S)-3-amino-2-oxetanones as their tosylate salts offers certain advantages. They may be prepared and stored (dry, 4° C.) analytically pure in multigram quantities and handled without problems in air. These β-lactones are free of residual CF$_3$COOH and CF$_3$COO$^t$Bu which can consume nucleophilic reagents, and thus are particularly well-suited for reactions in nonprotic solvents with a minimum amount of nucleophile or in reactions involving acid sensitive reagents/products.

Reaction of the 3-amino-2-oxetanone in TFA and subsequent isolation of the product as the tosylate salt by precipitation from ether was desirable for some products bearing electrophilic or nucleofugal β-substituents in order to prevent decarboxylative elimination or decomposition.

The unprotected L- or D-serine β-lactones, 3-amino-2-oxetanone, trifluoroacetic acid salt and 3-amino-2-oxetanone, p-toluenesulfonic acid salt, eagerly add even poor nucleophiles at the β-carbon to form free amino acids. Some of these free amino acids were previously inaccessible or difficult to prepare. Depending on the nucleophile used, the ring openings can be done in the tetrahydrofuran (THF), trifluoroacetic acid (TFA), polar aprotic solvents such as dimethylformamide and methyl cyanide, or even water.

Despite the fact that the 3-amino-2-oxetanone salts can hydrolyze quite rapidly in water, extremely high yields and chemoselectivity with adequate nucleophiles can be attained through control of pH. For example the reaction of (S)-3-amino-2-oxetanone, trifluoroacetic acid salt with thiol nucleophiles, such as L-cysteine or β-mercapto-ethylamine, at pH 5.0 to 5.5, proceeds exclusively by attack of sulfur to give LL-lanthionine and L-thialysine respectively.

Other sulfur nucleophiles also add to (3R) or (3S)-3-amino-2-oxetanone, trifluoroacetic acid salts. Reaction with lithium hydrosulfide produces D- or L-cysteine respectively in 88% recrystallized yield, thereby demonstrating the ability to generate expensive D-cysteine from inexpensive D-serine. Although this reaction was carried out in CH$_3$CN/THF, the results with other thiolate nucleophiles suggest that the same result could be achieved in H$_2$O at pH 5.

In view of the extremely high chemoselectivity of alkylation of the above poly-functional thiols by 3-amino-2-oxetanone, trifluoroacetic acid salts, at pH 5.5, this methodology should prove useful not only for the preparation of the numerous natural β-thio-substituted amino acids, but also in the chemical modification of peptides and proteins. Considerable manipulation has previously been required to produce differentially N-protected lanthioninee necessary for synthesis of the antibiotic peptides in which it is a constituent. Use of the unprotected serine β-lactones allows simple synthesie of mono-N-protected lanthioninee, or the post-synthetic conversion of cysteinyl residues of a peptide to lanthionine residues by chemoselective S-alkylation at pH 5.5 in the presence of all other side-chain functionalities.

Ring opening by sodium thiosulfate gives the Bünte salt, S-sulfo-L-cysteine, which is a metabolic precursor of L-cysteine and cephalosporin C in certain organisms.

The (3R) or (3S)-3-amino-2-oxetanone, p-toluenesulfonic acid salts condense quantitatively (by $^1$H NMR) with excess dimethyl sulfide in trifluoroacetic acid to produce the dimethylsulfonium salts of D- and L-cysteine which were isolated as the stable bis(tosylate) salts. This reaction is almost instantaneous, in contrast to the very sluggish condensation of dimethyl sulfide with the N-protected analogues N-protected β-lactones in dimethylformamide (DMF).

Careful choice of conditions is helpful in obtaining good yields of free amino acids. Initial attempts to isolate O-trifluoroacetyl-L-serine as its trifluoroacetate salt failed due to O to N acyl transfer with concomitant elimination to the N-trifluoroacetyldehydroalanine in 83% yield. However, addition of one equivalent of non-volatile p-toluenesulfonic acid allows isolation of the tosylate salt of O-trifluoroacetyl-L-serine. Treatment of O-trifluoroacetyl-L-serine, p-toluenesulfonic acid salt with nucleophiles (e.g., N$_3$−) produces exclusively L-serine, suggesting that any serine observed in non-aqueous reactions of (S)-3-amino- 2-oxetanone, trifluoroacetic acid salt probably arises in this manner.

Addition of concentrated phosphoric acid to (S)-3-amino-2-oxetanone, trifluoroacetic acid salt gives only L-serine on aqueous workup, but use of K$_2$HPO$_4$ in DMF with 18-crown-6 generates O-phospho-L-serine. This biologically important compound is usually synthesized by a tedious protection/deprotection strategy. Chloride is a better nucleophile, and despite its higher water content concentrated hydrochloric acid effectively converts (3R) or (3S)-3-amino-2-oxetanone, trifluoroacetic acid salts (or D- or L-BOC-serine β-lactones directly) to D- or L-β-chloro-alanine, which are antibiotics and suicide substratee for a variety of enzymes.

Aqueous potassium cyanide at pH 5 interacts with (S)-3-amino-2-oxetanone, trifluoroacetic acid salt to provide 60:40 mixture of L-serine and β-cyanoalanine. Alternatively, treatment of (S)-3-amino-2-oxetanone, trifluoroacetic acid salt under anhydrous conditions with tetra-n-butylammonium cyanide in DMF gives a good yield of β-cyano-L-alanine, a known toxin and enzyme inhibitor.

Reactions with most nitrogen nucleophiles were done under anhydrous conditions. Thus pyrazole combines with (S)-3-amino-2-oxetanone, p-toluenesulfonic acid salt in DMF to form β-(pyrazol-1-yl)-L-alanine. This suggests that a wide variety of amino acids bearing a heterocyclic ring connected through nitrogen at the B-carbon (e.g., quisqualic acid) could be synthesized analogously. Under similar conditions, sodium azide produces β-azido-L-alanine, a mutagenic metabolite isolated from Salmonella grown in the presence of azide. This labile compound has been chemically inaccessible by other approaches, because it cannot survive the conditions usually employed to deprotect amino acid derivatives.

In summary, the previously unreported salts of (3R) and (3S)-3-amino-2-oxetanone are readily accessible and provide a short and practical route to a variety of unprotected, optically pure amino acids which can often be difficult or tedious to prepare by other means. In most cases, the nucleophilic openings of the serine β-lactone can be accomplished with equal facility on either the (3R) or (3S) enantiomers of the 3-amino-2-oxetanone, trifluoroacetic acid salt or 3-amino-2oxetanone, p-toluenesulfonic acid salt under similar conditions. Use of 3-amino-2-oxetanone, trifluoroacetic acid salts are advantageous in "one pot" conversions of D- or L-BOC-serine β-lactones to the corresponding D- or L-amino acid, whereas 3-amino-2-oxetanone, p-toluenesulfonic acid salts are easily isolable reagents with a long shelf life that can be prepared in multigram quantities and used as needed. Since both enantiomers of serine are relatively inexpensive, and L-serine is readily available in isotopically labeled form, this approach is useful for rapid syntheses of sensitive D-amino acids as well as for preparation of the labeled L-isomers.

The deprotection of the N-protected serine β-lactones can also occur in the presence of acids other than the trifluoroacetic acid and p-toluenesulfonic acid described in the above preferred embodiments. Such other acide would include alkylsulfonic acids, arylsulfonic acids, trifluoromethanesulfonic acid, perchloric acid and tetrafluoboric acid.

Further details of the preferred embodiments of the invention will be understood from the following Examples which are understood to be non-limiting with respect to the appended claims.

It should be understood that although most Examples involve synthesis of L-amino acids from BOC-L-serine β-lactone via (3S)-3-amino-2-oxetanone salts, all of the corresponding D-amino acids could be prepared in an identical fashion proceeding from BOC-D-serine β-lactone via (3R)-3-amino-2-oxetanone salts.

The following general procedures and instrumentation were used in performing the examples detailed below:

Trifluoroacetic acid (TFA) was dried over $P_2O_5$, distilled, and stored under argon atmosphere. Anhydrous p-toluenesulfonic acid was prepared from the monohydrate by solution in hot benzene with the aid of ethyl acetate, azeotropic removal of water to 50% volume, and crystallization by cooling to 0° C. The resulting crystals (mp 94°-95° C.) were dried in vacuo and stored in a desiccator. Water was processed through a Millipore Milli-Q (trademark) apparatus and degassed by boiling under argon atmosphere. Aqueous HCl was prepared free of metal ions from this water and glass-distilled constant-boiling (~110° C.) 5.7N HCl. Dimethylformamide (DMF) was stirred with BaO (16 h), decanted, and distilled at reduced pressure. Infrared (IR) spectroscopic analyses on aqueoue solutions of (S)-3-amino-2-oxetanone, p-toluenesulfonic acid salt were done on a Nicolet 7199 FT-IR (trademark) spectrometer using 0.1 mm IR- TRANS cells (Kodak,(-trademark) polycrystalline ZnS). Thin layer chromatography (TLC) of amino acids on silica gel usually employed three eolvent systems: System A—pH 5.80, 50 mM potassium phosphate buffer/ethanol (30/70); System B—n-BuOH/HOAc/H20 (4:1:1); System C—MeOH/pyridine/11.6M HCl/$H_2O$.

EXAMPLE 1

Preparation of (3R) and (3S)-3-Amino-2-Oxetanone, Trifluoroacetic Acid Salts

BOC-L-serine β-lactone (187 mg, 100 mmol) was treated with distilled $CF_3COOH$ (3.0 mL) at 0°-5° C. for 10 min. The solvent was removed in vacuo by bulb-to-bulb distillation at 25° C. (receiving bulb at −78° C.) with the aid of a Kugelrohr (trademark) apparatus, and the residue was dissolved in the desired solvent and immediately reacted with a nucleophile. The yield is quantitative by $^1$H NMR (360 MHz, $CF_3COOD$): δ 5.51 (m, 1H, CH), 4.87 (m, 2H, $CH_2$); IR $H_2O$ solution) 1836 $cm^{-1}$; IR ($CH_3CN$ solution) 1842 $cm^{-1}$; POSFAB-MS (glycerol) 88 ($MH^+$), 289 ($[(MH)_2.CF_3COO]^+$); $R_f$~0.77 (System A, some hydrolysis on plate). Satisfactory elemental analysis could be obtained only on the tosylate salt. The enantiomeric (R)-3-amino-2-oxetanone salt was produced in an identical manner from BOC-D-serine β-lactone prepared from BOC-D-serine.

EXAMPLE 2

Preparation of (S)-3-Amino-2-Oxetanone, p-Toluenesulfonic Acid Salt

BOC-L-serine β-lactone (600. mg, 3.20 mmol) and anhydrous p-toluenesulfonic acid (579 mg, 3.36 mmol) were treated with distilled $CF_3COOH$ (10 mL) at 0°-5° C. for 10 min. Removal of solvent in vacuo as above provided a white crystalline residue which was triturated with dry $Et_2O$ (20 mL) and filtered to yield (S)-3-amino-2oxetanone p-toluene sulfonic acid salt (806 mg, 97%). This material was analytically pure; however, if desired, recrystallization could be effected from DMF/$Et_2O$ (25° C.→−20° C.): mp (~4° C./min) 135° C. (darkening), 173° C. (dec. rapid); $[α]_D^{25}$ −15.9 (±0.1)° (c 2.2, DMF); IR 3040 (s, vbr), 1838 (vs), 1600 (w), 1585 (w), 1550 (m) $cm^{-1}$; IR (pH 6.8, aqueous solution) 1820 $cm^{-1}$; IR (DMF solution) 1830 $cm^{-1}$; 1H NMR (300 MHz, $d_7$-DMF)δ 7.66 (d, 2H, 8.0 Hz, o-ArH), 7.15 (d, 2H, 8.0 Hz, m-ArH), 5.53 (dd, 1H, 4.6, 6.5 Hz, CH), 4.74 (m, 1H, CHHO), 4.68 (m, 1H, CHHO), 3.70 (vbr s, 3H, $NH_3+$), 2.31 (s, 3H, $ArCH_3$); $^{13}C$ NMR (75.5 MHz, $d_7$-DMF) δ 165.84, 145.12, 139.14, 128.67, 126.08, 64.70, 57.45, 20.70. Anal. Calc. for $C_{10}H_{13}NO_5S$: C, 46.32; H, 5.05; N, 5.04; S, 12.37. Found: C, 46.44; H, 5.14; N, 5.24; S, 12.41; POSFAB-MS (glycerol) 88 ($MH^+ = C_3H_6NO_2$), 180 ($MH^+$(gly)), 260 ($MH^+$(TsOH)). The enantiomeric (R)-3-amino-2-oxetanone salt was produced in an identical manner from BOC-D-serine β-lactone prepared from BOC-D-serine.

EXAMPLE 3

L,L-Lanthionine from (S)-3-amino-2-oxetanone Trifluoroacetic Acid Salts

To L-cysteine (0.473 g, 3.91 mmol) in degassed H$_2$O (5 mL) at pH 5.3 was added (S)-3-amino-2-oxetanone trifluoroacetic acid salts (produced from 0.244 g, 1.30 mmol of BOC-L-serine β-lactone) in H$_2$O (5 mL). The pH of the mixture was maintained at 5.0–5.5 with dropwise addition of 1N NaOH. After 40 min the pH remained constant and the material was applied to a column of BioRad AG50-X8 (trade mark) resin (80 mL, 3 cm dia., H$^+$ form). Elution with a linear gradient of aqueous HCl (0 →0.5M over 1.5 L) provided chromatographically pure L,L-Lanthionine which was recovered by removal of solvent in vacuo. This material was recrystallized by suspending in H$_2$O (2.5 mL), dissolving by addition of conc. ammonia, cooling to 0° C., and neutralization (pH 6) with formic acid. Cooling several hours at 4° C. yielded L,L-Lanthionine (251 mg, 93% overall) as the zwitterion: mp 294°–295° C. (dec, darkens at 247° C.) (lit. mp 293°–295° C. (dec)); [α]$_D$25 +8.6. (c 5.0, 2.4N NaOH) (lit. [α]$_D$22 +6 (±1)° (c 1.0, 1N NaOH), +7° (c 1, 1N NaOH), +8.4 (c 1.0, 1.0N NaOH), (c 1.4, 2.4N NaOH), +8.6° (c 5.0, 2.4N NaOH), +9.4° (c 1.4, 2.4N NaOH), IR (KBr disk) 3400 (W, br), 3300–2250 (s, br), 2080 (w), 1608 (s), 1593 (s), 1512 (s), 1389 (s), 1347 (s), 539 (m) cm$^1$; 1H NMR (300 MHz, D$_2$O +DCl) 4.45 (dd, 2H, 7.4, 4.4 Hz, 2 CH), 3.3B (dd, 2H, 4.4, 15.0 Hz, 2 CHHS), 3.26 (dd, 2H, 7.4, 15.0 HZ, 2 CHHS). Anal. Calc. for C$_6$H$_{12}$N$_2$O$_4$: C, 34.61; H, 5.81; N, 13.45; S, 15.40. Found: C, 34.63; H, 5.84; N, 13.50; S, 15.43; POSFAB-MS (glycerol/HCl) 209 (MH$^+$), 417 (M$_2$H$^+$); R$_f$ 0.33 (System A). HPLC analysis of L,L-Lanthionine from (S)-3-amino-2-oxetanone trifluoroacetic acid salt indicates no detectable meso-lanthionine (i.e. <1%) in the sample.

L-Cysteine and (R)-3-amino-2-oxetanone, trifluoroacetic acid salt produce meso-lanthionine, while D-cysteine and the (R)-3-amino-2-oxetanone salt can be utilized to prepare D,D-lanthionine in an exactly analogous manner.

EXAMPLE 4

S-(Aminoethyl)-L-Cysteine Hydrochloride from (S)-3-Amino-2-Oxetanone Trifluoroacetic Acid salt To 2-aminoethanethiol hydrochloride (201 mg, 1.77 mmol) in degassed H$_2$O (3.0 mL) was added (S)-3-amino-2-oxetanone trifluoroacetic acid salt (produced from BOC-L-serine β-lactone (151 mg, 0.807 mmol)) in H$_2$O (1.0 mL). The pH of the stirred solution was maintained at 5.0–5.5 by dropwise addition of 1N NaOH. When additions of base were no longer required to maintain the pH at 5.5 (~35 min), the mixture was applied to a column of BioRad AG50-X8 (trademark) (80 mL, 3 cm dia., H$^+$ form) and eluted with a linear gradient (0 to 0.2M over 1.0 L) of aqueous HCl (2 mL/min). Lyophilization of the chromatographically pure fractions yielded 138 mg 85%) of S-(aminoethyl)-L-cysteine hydrochloride which was recrystallized from EtOH/acetone (85% recovery) for elemental analysis: mp 193°–194° C. (dec) (lit. mp 192°–192.5° C., 205°–207° C.); [α]$_D$25 +7.2 (c 1.0, H$_2$O) (lit. [α]$_D$ +7.2 (c 1, H$_2$O)); IR (KBr disk) 3650–2100 (s, br), 2000 (W, br), 1622 (s), 1587 (s), 1516 (s), 1494 (s), 1463 (s), 1427 (s), 1415 (s), 1400 (s), 1348 (s), 1303 (s), 560 (m) cm$^{-1}$;

$^1$H-NMR (300 MHz, D$_2$O)δ 4.00 (dd, 1H, 4.8, 6.0 Hz, CH), 3.27 (t, 2H, 6.5 Hz, CH$_2$NH$_3$$^+$), 3.16 (dd, 1H, 4.8, 14 Hz, CHCHHS), 3.14 (d, 6.0, 14 Hz, CHCHHS), 2.94 (t of d, 1H, 6.5, 14 Hz, SCHH), 2.92 (t of d, 1H, 6.5, 14.0 Hz, SCHH). Anal. Calc. for C$_5$H$_{13}$N$_2$O$_2$SCl: C, 29.92; H, 6.54; N, 13.96; Cl, 17.66; S, 15.97. Found: C, 29.59; H, 6.44; N, 13.98; Cl, 17.40; S, 15 88; POSFAB-MS (glycerol/HCl) 165 (MH$^+$), 329 (M$_2$H$^+$); R$_f$~0.20 (System A).

EXAMPLE 5

L- and D-Cysteine from (3S) and (3R)-3-Amino-2-Oxetanone Trifluoroacetic Acid Salt A suspension of LiSH (1.23M) in THF was produced by bubbling H$_2$S(g) into THF containing 1.23M n-BuLi at 0° C. To the suspension of LiSH (2.24 mmol, 1.82 mL of 1.23M was added (S)3-amino-2-oxetanone TFA salt [produced from 210 mg, 1.12 mmol of BOC-L-serine β-lactone] in CH$_3$CN (1 mL). The mixture was stirred 1 h under Ar, acidified with conc. HCl (0.15 mL, 1.8 mmol), and solvent was removed in vacuo at 35° C. The residue was dissolved in H$_2$O and applied to a column of AG50-X8 (trademark) (80 mL, 3 cm dia., H$^+$ form). Elution with a linear gradient of degassed aqueous HCl (0 to 2M over 1L) provided L-cysteine hydrochloride free of cysteine after removal of solvent in vacuo. This material was isolated as the zwitterion from a minimal amount of EtOH by adjusting the pH to 6.5 with conc. NH$_3$, cooling to −20° C., and immediate recrystallization of the precipitate from hot degassed H$_2$O to yield L-cysteine (120. mg, 88% overall): mp 240°–241° C. (dec) (lit. mp 240° C. (dec)); [α]$_D$25 +6.5 (±0.2)° (c 2.0, 5N HCl ) (lit. [α]$_D$25 +6.5 (c 2, 5N HCl )); IR KBr disk) 3600–2650 (s, br), 2542 (m), 2160–1980 (w, br), 1610 (s), 1582 (s), 1519 (s), 1397 (s), 1291 (m), 658 (m), 528 (m), 510 (m) cm$^{-1}$;$^1$H NMR (300 MHz, D$_2$O)δ 4.31 (dd, 1H, 4.5, 5.5 Hz, CH), 3.16 (dd, 1H, 5.5, 15.0 Hz, CHHS), 3.13 (dd, 1H, 4.5, 15.0 Hz, CHHS). Anal. Calc. for C$_3$H$_7$NO$_2$S: C, 29.74; H, 5.83; N, 11.56; S, 26.46. Found: C, 29.46; H, 5.85; N, 11.55; S, 26.68; POSFAB-MS (glycerol/HCl ) 122 (MH$^+$), 243 (M$_2$H$^+$); R$_f$0.45 (System A). Preparation of D-cysteine was effected analogously from BOC-D-serine β-lactone.

EXAMPLE 6

S-Sulfo-L-Cysteine, Monosodium Salt Dihydrate

To Na$_2$S$_2$O$_3$ (73.2 mg, 0.463 mmol) in H$_2$O (I mL) at pH 5.0 was added (S)-3-amino-2-oxetanone TFA salt (produced from BOC-L-serine β-lactone (43.0 mg, 0.23 mmol)) in H$_2$O (1 mL). The pH was maintained at 5.0 for 1 h and the solvent was removed in vacuo at 25° C. The residue was dissolved in H$_2$O (1.0 mL), applied to a column of Rexyn 102 trademark) (1×10 cm, H$^+$ form) and eluted with (0.25 mL/min). S-sulfo-L-cysteine (R$_f$ 0.81, System A; characteristic brown color with ninhydrin) eluted chromatographically pure as the monosodium salt after 15–20 mL. Lyophilization and recrystallization from H$_2$O/Et$_2$O (pH 5) provided 49.7 mg (83%) of S-sulfo-L-cysteine monosodium salt dihydrate as a white solid: mp 35° C. foams but remains white (loss of H$_2$O), 202°–204° C. (dec); [α]$_D$25 −83.7 (±0.2)° (c 2.5, H$_2$O (lit. [α]$_D$25 −86.8° (c 4.73, H$_2$O)$^{37}$ for the 1κ hydrate); IR (KBr disk) 3450 (m, br), 3150 (m, br), 1635 (s, br), 1515 (m), 1400 (m), 1358 (m), 1235 (s), 1217 (s), 1200 (s), 1137 (s), 1030 (s), 636 (s) cm$^{-1}$; $^1$H NMR (300 MHz, D$_2$O δ 4.18 dd, 1H, 3.7, 8.0 Hz, CH), 3.68 (dd, 1H, 3.7, 15.5 Hz, CHHSSO$_3^-$), 3.50 (dd, 1H, 8.0, 15.5 Hz, CHHSSO$_3^-$). Anal. Calc. for C$_3$H$_6$NO$_5$S$_2$Na.2H$_2$O (FW 259.2 : C, 13.90; H, 3.89; N, 5.40; S, 24.74. Found: C, 14.11; H, 3.85; N, 5.21; S, 24.59; NEG-FAB-MS (glycerol) 200 ($^-$O$_3$SSCH$_2$CH(NH$_2$)COOH).

EXAMPLE 7

L-Cysteine Dimethylsulfonium Bis(p-Toluenesulfonic Acid) Salt

To (S)-3-amino-2-oxetanone p-toluenesulfonic acid salt (100. mg, 0.386 mmol) and anhydrous p-toluenesulfonic acid (99.6 mg, 0.579 mmol) in trifluoroacetic acid (3.0 mL) was added dimethylsulfide (113 μL, 1.54 mmol). After 15 min the solvent was removed in vacuo. The syrupy residue was dissolved in MeOH (5 mL) and L-cysteine dimethylsulfonium, bis(p-toluenesulfonic acid) salt crystallized ae shiny white needles (168 mg, 88%) following addition of Et$_2$O(20 mL) and cooling to $-20°$ C.: mp 141°-142° C. (dec); [α]$_D$+11.8 (±0.4)° (c 0.96, DMF); IR (MeOH cast) 3483 (m), 2930 (m, vbr), 1742 (m), 1193 (vs), 815 (m), 682 (m), 567 (s), cm$^{-1}$; $^1$H NMR (300 MHz, d$_4$-MeOH)δ 7.70 (d, 4H, 8 Hz, o-ArH), 7.24 (d, 4H, 8 Hz, H-ArH), 4.65 (dd, 1H, 5.8, 8.2 Hz, CH), 3.95 (dd, 1H, 8.2, 13.8 Hz, CHHS), 3.81 (dd, 1H, 5.8, 13.8 Hz, CHHS), 3.07 (s, 3H, S(CH$_3$)CH$_3$), 3.06 (s, 3H, S(CH3)CH$_3$), 2.36 (s, 6H, ArCH$_3$). Anal. Calc. for C$_{19}$H$_{27}$NO$_8$S$_3$: C, 46.23; H, 5.51; N, 2.84; S, 19.48. Found: C, 46.15; H, 1 5.49; N, 2.91; S, 19.55; EI-MS:172.0195 (TsOH), 62.0207 (Me2S); pOSFAB-MS (glycerol) 150 (100%, Me$_2$S$^+$CH$_2$CH(NH$_2$)COOH); R$_f$~0.08 (System A).

EXAMPLE 8

O-Trifluoroacetyl-L-Serine, p-Toluenesulfonic Acid

BOC-L- serine β-lactone (1.06 mg, 0.566 mmol) and BioRad AG1-X8 (trademark) resin (240 mg, ~0.8 meq, CF$_3$COO$^-$ form, previously dried in vacuo at 64° C.) were treated with distilled trifluoroacetic acid (4 mL) and the mixture was stirred 16 h under Ar. The resin was removed by filtration and washed with CF$_3$COOH (2×1 mL). p-Toluenesulfonic acid (97.5 mg, 0.566 mmol) was added to the combined filtrate and washings and trifluoroacetic acid was removed by bulb-to-bulb distillation in vacuo. The white solid residue was triturated with dry Et$_2$O (5 mL), filtered, and washed well with ether to yield O-trifluoroacetyl-L-serine, p-toluenesulfonic acid salt (178.5 mg, 87%): mp 181.5°-182.0° C. (darkens at 178° C.); [α]$_D$25 +10.0 (±0.4)° (c 0.45, DMF); IR (KBr disk) 3420 (m, vbr), 3300-2400 (s, vbr), 1799 (s), 1754 (s), 1621 (w), 1600 (w), 1532 (m), 1345 (w), 1229 (m), 1194 (s), 1156 (vs), 1129 (m), 1041 (s), 1014 (s), 812 (m), 691 (s) cm$^{-1}$;$^1$H NMR (400 MHz, d$_7$-DMF)δ 6 9.15 (br s, ~4H, COOH,NH$_3^+$), 7.66 (d, 2H, 8.0 Hz, o-ArH), 7.14 (d, 2H, 8.0 Hz, H-ArH), 5.14 (dd, 1H, 2.4, 12.3 Hz, CHHO), 5.01 (dd, 1H, 4.6, 12.3 Hz, CHHO), 4.88 (br m, 1H, CH), 2.30 (s, 3H, ArCH3 ); $^{19}$F NMR (376.5 MHZ, d$_7$-DMF)δ $-75.5$ (s, CF$_3$COO). Anal. Calc. for C$_{12}$H$_{14}$NO$_7$SF$_3$: C, 38.61; H, 3.78; N, 3.75. Found: C, 38.96; H, 3.93; N, 3.99; El-MS: 172.0195 (TsOH), 156.0274 ((M-CO$_2$H)=C$_4$H$_5$NO$_2$F$_3$); POSFAB-MS (glycerol) 202 (MH$^+$=CF$_3$COOCH$_2$CH(NH$_3^+$)COOH), 374 (MH$^+$.TsOH), 294 (MH$^+$ gly); R$_f$~0.68 (System A, some hydrolysis on plate).

EXAMPLE 9

2-(N-Trifluoroacetyl)amino]propenoic acid

BOC-L-serine β-lactone (144 mg, 0.769 mmol) was dissolved in distilled trifluoroacetic acid and allowed to stand 16 days under Ar. Bulb-to-bulb distillation in vacuo (0.1 torr) at 25° C. first removed the trifluoroacetic acid and subsequently caused the sublimation of a white solid which was collected in a clean chilled receiving bulb. The last third of 2-[(N-trifluoroacetyl-)amino]propenoic acid sublimate was obtained on warming to 45° C. to give a total of 117 mg (83%) of 2=[-Trifluoroacetyl)amino]propenoic acid. $^1$H NMR on the pot residue indicated it was primarily O-trifluoroacetyl-serine. For 2-[(N-trifluoroacetyl)amino]-propenoic acid: mp 126°-128° C.; IR (CH$_3$CN cast) 3380 (m), 3400-2200 (mult, br, W), 1744 (m), 1702 (vs), 1638 (w), 1552 (s), 1445 (s), 1300 (m), 1213 (s), 1188 (m), 1164 (s), 910 (m) cm$^{-1}$; $^1$H NMR (300 MHz, CD$_3$CN)δ 8.72 (br s, ~1H, NH), 6.46 (s, 1H, E-CHH), 6.11 (s, 1H, Z-CHH). Anal. Calc. for C$_5$H$_4$NO$_3$F$_3$: C, 32.80; H, 2.20; N, 7.65. Found: C, 32.52; H, 2.18; N, 7.62; EI-MS: 183.0134 (183.0144 calcd.); Cl-MS (NH$_3$) 201 (M+NH$_4^+$); R$_f$~0.87 (System B; UV active, pink-brown with ninhydrin).

EXAMPLE 10

O-Phosoho-L-serine

K$_2$HPO$_4$ (0.446 g, 3.28 mmol, dried 4 h at 130° C.) and 18-crown-6 ether (0.867 g, 3.28 mmol) were stirred 16 h in anhydrous DMF (10 mL). BOC-L-serine β-lactone (169 mg, 0.902 mmol) was deprotected to (S)-3-amino-2-oxetanone trifluoroacetic acid salt and added as a solution in DMF (3 mL). The mixture was stirred 3 days, diluted with H$_2$O (to 50 mL), and applied to a column of AG1-X8 (trademark) (80 mL, 3 cm dia., OH-form). Elution (2 mL/min) with a linear gradient (0 to 3M over 10 L) of formic acid afforded O-phospho-L-serine 145.6 mg) in 87% yield after lyophilization: mp 170°-171° C. (dec) (lit. mp 175°-176° C. (dec)); [α]$_D$25 +7.2° (c 1.0, H$_2$O) (lit. [α]$_D$25 +7.2° (c 1.0, H$_2$O)); IR (KBr disk) 3420 (w, br), 3180 (w), 2700 (w), 2400-2260 (w), 1620 (w), 1560 (m), 1260 (m), 1089 (s), 1045 (s), 1000 (s), 970 (s), 740 (m), 810 (m) cm$^{-1}$; $^1$H NMR (300 MHz, D$_2$O+DCl)δ 4.37-4.27 (m, 2H, CH-CHH), 4.26-4.16 (m, 1H, CHH)$^{31}$; 31p NMR (161.96 MHz, D$_2$O+DCl) $-0.45$ (br s). Anal. Calc. for C$_3$H$_3$NO$_6$P: C, 19.47; H, 4.35; N, 7.57. Found: C, 19.27; H, 4.29; N, 7.82; POSFAB-MS (glycerol/HCl ) 186 (MH$^+$), 371 (M$_2$H$_+$); R$_f$0.43 (System A).

EXAMPLE 11

L- and D-β-Chloro-alanines

Concentrated HCl (1.0 mL, ~12 mmol) was added to (S)-3-amino-2-oxetanone trifluoroacetic acid salt produced from BOC-L-serine β-lactone (92.0 mg, 0.492 mmol). After 5 min H$_2$O (5 mL) was added and the solvent was removed in vacuo at 35° C. The residue was redissolved in H$_2$O (5 mL) and again the solvent was removed. Recrystallization of the solid residue from MeOH/Et$_2$O yields 78.5 mg (92%) of β-chloro-L-alanine as its hydrochloride salt. Since literature reports that the hydrochloride has "no distinct mp" and [α]$_D$"-close to zero", the material was converted to the free base for complete characterization. Hence, the hydrochloride was dissolved in a minimal amount of H$_2$O, one equivalent of 2N LiOH was added, and β-Chloro-L-alanine (56.5 mg, 93% recovery) was obtained by addition of excess EtOH with cooling to −10° C. Most conveniently, nearly identical yield of the hydrochloride of β-chloro-L-alanine was also obtained eimply by addition of conc. HCl to BOC-L-serine β-lactone (1.0 mL/100 mg): β-Chloro-D-alanine HCl salt could be similarily obtained from addition of conc. HCl to BOC-D-serine β-lactone.

For β-chloro-L-alanine (hydrochloride): $[\alpha]_D25$ +0.80° (c 1.0, H$_2$O); IR (KBr disk) 3720–2200 (vs, br), 1980 (m), 1960 (m), 1745 (vs), 1600 (s), 1500 (vs), 1410 (s), 1350 (s), 1230 (s), 1200 (s), 1150 (m), 1070 (m), 890 (m), 850 (s), 790 (s), 680 (s) cm$^{-1}$; 1H NMR (80 MHz, D$_2$O)δ 6 4.60–4.44 (m, 1H, C$\underline{H}$), 4.25–4.07 (m, 2H, C$\underline{H}_2$Cl). Anal. Calc. for C$_3$H$_7$NO$_2$Cl$_2$: C, 22.52; H, 4.42; N, 8.75. Found: C, 22.09; H, 4.48; N, 8.63; POSFAB-MS (glycerol) 124 (MH+); R$_f$0.76 (System A).

For free base β-chloro-L-alanine: mp 156°–157° C. (lit. mp 160° C.); $[\alpha]_D25$-15.8°, (c 1.0, H$_2$O) (lit. $[\alpha]_D20$ −15.5° (c 1, H$_2$O, −15 (c 9.9, H$_2$O)); IR (KBr disk) 3660–2160 (m, mult, br), 2080 (w), 1630 (s), 1600 (s), 1390 (s), 1300 (s), 860 (s), 640 (s), 540 (s), 450 (s) cm$^{-1}$; 1H NMR (300 MHz, D$_2$O)δ 4.62 (dd, 1H, 3.25, 4.5 Hz, C$\underline{H}$), 4.21 (dd, 1H, 4.5, 13.0 HZ, C$\underline{H}$HCl ), 4.10 (dd, 1H, 3.25, 13.0 Hz, CH$\underline{H}$Cl). Anal. Calc. for C$_3$H$_6$NO$_2$Cl: C, 29.16; H, 4.90; N, 11.34; Cl, 28.69. Found: C, 28.99; H, 4.95; N, 11.08; Cl, 28.51; pOSFAB-MS (glycerol) 124 (MH+).

EXAMPLE 12

β-Cyano-L-alanine from (S)-3-Amino-2-Oxetanone Trifluoroacetic Acid Salt

A solution of (S)-α-amino-2-oxetanone trifluoroacetic acid salt (prepared from 79.0 mg, 0.422 mmol of BOC-L-serine β-lactone) in DMF (2 mL) was added dropwise to tetra-n-butylammonium cyanide (170 mg, 0.633 mmol) in DMF (3 mL) at −10° C. over 10 min. The solution was stirred 30 min at −10° C. and allowed to warm to 25° C. over 30 min. The solvent was removed in vacuo at 25° C. to yield an orange syrup which was dissolved in H$_2$O (1 mL) and applied to a column of AG11 A8 (30 g, 1×40 cm). Elution with H$_2$O (0.4 mL/min), and lyophilization of the fractions which produced the characteristic blue-green color with ninhydrin spray reagent provided 40.3 mg (84%) of β-cyano-L-alanine free of salts. For an improved melting point this solid precipitated from pH 6.0 H$_2$O by addition of dioxane and dried in vacuo over P$_2$O$_5$ (34.5 mg, 72% yield after two precipitations): mp 213°–216° C. (dec, 1st ppt), 217°–218° C. (2nd ppt) (lit.mp 206° C., 208°–209° C., 218°–218.5° C.); $[\alpha]_D25$ −2.9. (c 1.4, 1N HOAc)(lit. $[\alpha]_D25$ −2.9 (c. 1.4, 1N HOAc)); IR (KBr disk) 3420 (m, br), 3020 (s, br), 2225 (w), 1630 (vs, br), 1610 (s), 1575 (m), 1528 (s), 1417 (s), 1330 (s), 1160 (w), 1070 (w), 880 (w) cm$^{-1}$; 1H NMR (200 MHz, D$_2$O)δ 4.10 (t, 1H, 5.8 Hz, C$\underline{H}$), 3.08 (d, 2H, 5.8 Hz, C$\underline{H}_2$CN); POSFAB-MS (glycerol/HCl ) 115 (MH+), 229 (M$_2$H+), 343 (M$_3$H+); R$_f$~0.65 (System A, characteristic blue-green color with ninhydrin).

EXAMPLE 13

β-(Pyrazol-1-yl)-L-alanine (S)-3-Amino-2-oxetanone tosylate salt (100 mg, 0.385 mmol) was added to pyrazole (131 mg, 1.93 mmol) in distilled DMF (3.0 mL) and the mixture was stirred at 25° C. for 2.5 h. The solvent was removed in vacuo at 25° C. and the residue was dissolved in H$_2$O (3 mL) and applied to a column of BioRad AG50-X8 (trademark) (1×10 cm, H+ form) The resin was washed with H$_2$O (30 mL) and eluted with a gradient of aqueous NH$_4$OH (0 to 0.25N over 70 mL, then 100 mL of 0.25N NH$_4$OH). The product emerged chromatographically pure with 0.25N NH$_4$OH and was lyophilized (2×) and dried in vacuo over P$_2$O$_5$ to yield 77% (46.2 mg) of β-(pyrazol-1-yl)-L-alanine (mp 234°–236° C. (dec)). For an improved melting point this material could be recrystallized from H$_2$O/ EtOH: mp 241°–243° C. (lit. mp 236°–238° C. (dec), 243° C. (dec)); $[\alpha]_D25$ −72(±1) (c 0.54, H$_2$O) (lit. $[\alpha]_D$ −78° (c 3.4, H$_2$O), −72.0° (c 1. H$_2$O)); IR (KBr disk) 3700–2200 (m, vbr), 1617 (s), 1580 (s), 1485 (m), 1395 (m), 767 (m) cm$^{-1}$; 1H NMR (300 MHz, D$_2$O)δ 7.65 (d, 1H, 2 Hz, ArHH'H''), 7.61 (d, 1H, 2 Hz, ArHH'H''), 6.38 (t, 1H, 2 Hz, ArHH'H''), 4.66 (d, 2H, 5 Hz, C$\underline{H}_2$N), 4.18 (t, 1H, 5 Hz, C$\underline{H}$); POSFAB-MS glycerol/$\overline{HCl}$ ) 156 (MH+), 311 (M$_2\overline{H}$+); R$_f$0.67 (Solvent A; characteristic blue-purple color with ninhydrin).

EXAMPLE 14

β-Azido-L-alanine

A solution of (S)-3-amino-2-oxetanone p-toluenesulfonic acid salt (53.0 mg, 0.204 mmol) in DMF (1 mL) was added to NaN$_3$ (14.6 mg, 0.225 mmol) in DMF (5 mL) and the mixture was stirred 3.5 h. The solvent was removed in vacuo at 25° C. The residue was dissolved in H$_2$O (0.3 mL) and applied to a column of Bio-Rad Ion Retardation Resin Ag11 A8 (trademark) (15 g, 1×20 cm) and eluted with H$_2$O (0.3 mL/min). Fractions containing amino acid were pooled and lyophilized to yield 25.6 mg (96%) of pure β-azido-L-alanine. For the optimum melting point this material was recrystallized by dissolving in a minimal volume of H$_2$O at 40° C., adding MeOH (3 vol.) and acetone (until cloudy) and cooling to −20° C.: mp 174°–175° C. (dec); $[\alpha]_D25$ +37.2 (±0.5) (c 0.5, H$_2$O); IR (K8r disk) 3420 (m, br), 3070 (s, br), 2113 (s), 1600 (vs, br), 1440 (s) cm$^{-1}$; 1H NMR (300 MHz, d$_4$-MeOD)δ 3.63 (dd, 1H, 4.5, 12 Hz, CHHN$_3$), 3.53 (dd, 1H, 7.2, 12 Hz, CHN3), 3.37 (dd, 1H, 4.5, 7.2 Hz, C$\underline{H}$); 1H NMR (300 MHz, D$_2$O)δ 3.93 (dd, 1H, 5.0, 17.5 Hz, C$\underline{H}$HN$_3$), 3.92 (m, 1H, C$\underline{H}$), 3.84 (dd, 1H, 7.0, 17.5 Hz, $\overline{CH}$HN$_3$); EI-MS: 131.0570 (MH+, Calc. 131.0570 for C$_3\overline{H}_7$N$_4$O$_2$), 88.0400 (MH+-HN$_3$), 85.0515 (M-CO$_2$H), 74.0245 (Base peak, M-CH$_2$N$_3$); POSFAB-MS (glycerol) 131 (MH+); R$_f$ 0.80 (System A; UV active; brown-purple with ninhydrin).

The above examples are summarized in Table 1.

TABLE 1

Reactions of Nucleophiles with (S)-3-Amino-2-oxetanone Salts

| Method[a] | Reagent (equiv.) | Conditions | X of H$_2$N | Product[e] | Yield[b] |
| --- | --- | --- | --- | --- | --- |

TABLE 1-continued

| Method | Reagent | Conditions | X | # | Yield |
|---|---|---|---|---|---|
| A | L-cysteine (3) | pH 5.5, H₂O, 40 min | (S)—⁻OOC(H₃N⁺)CHCH₂S— | 1a | 93 |
| A | H₂NCH₂CH₂SH.HCl (2) | pH 5.5, H₂O, 35 min | H₂NCH₂CH₂S— | 1b | 85 |
| A | LiSH (3) | CH₃CN/THF, 1 h | HS— | 1c | 88 |
| A | Na₂S₂O₃ (2) | pH 5.0, H₂O, 1 h | Na⁺⁻O₃SS— | 1d | 83 |
| B | Me₂S (4) | TsOH (1.5 eq), CF₃COOH, 15 min | Me₂S⁺— | 1e | 88[d] |
| C | CF₃COO⁻/AG1 (1.3) | CF₃COOH, 16 h | CF₃COO— | 1f | 87[d] |
| A | K₂HPO₄ (3) | 18-crown-6 (1 eq), DMF, 72 h | H₂PO₄— | 1g | 87 |
| A/C | conc. HCl (24-5) | 30 min | Cl— | 1h | 92[c] |
| A | n-Bu₄N⁺CN⁻ (1.5) | DMF, −10° C. (.5 h) → 25° C. (.5 h) | N≡C— | 1i | 84 |
| B | 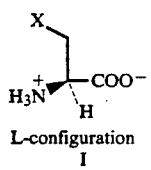 (5) | DMF, 2.5 h | 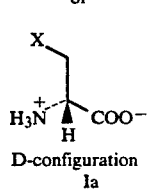 | 1j | 77 |
| B | NaN₃ (3) | DMF, 1 h | N₃— | 1k | 96 |

FOOTNOTES TO TABLE 1
a Methods:
A, (S)-3-amino-2-oxetanone, trifluoroacetic acid salt produced and used immediately after removal of trifluoroacetic acid;
B, (S)-3-amino-2-oxetanone, p-toluenesulfonic acid salt used;
C, (S)-3-amino-2-oxetanone, trifluoroacetic acid salt generated in situ
b Isolated Yield
c - isolated as hydrochloride salt
d - isolated as tosylate salt
e Products
1a - L,L-lanthionine
1b - (S)-(aminoethyl)-L-cysteine hydrochloride
1c - L-cysteine
1d - S-sulfo-L-cysteine, monosodium salt dihydrate
1e - L-cysteine dimethylsulfonium, bis(p-toluenesulfonic acid)salt
1f - O-trifluoroacetyl-L-serine, p-toluenesulfonic acid salt
1g - O-phospho-L-serine
1h - β-chloro-L-alanine
1i - β-cyano-L-alanine
1j - β(pyrazol-1-yl)-L-alanine
1k - β-azido-L-alanine Although preferred embodiments of the invention are described herein in detail, it would be understood by those skilled in the art that variations may be made thereto without departing from the spirit of the invention or the scop of the appended claims.

The embodiments of the invention in which an exclusive property or privilege is claimed are defined as follows:

1. A process for the preparation of optically pure, free alpha-amino acids of the formulas I and Ia, respectively:

$$\begin{array}{c} X \\ | \\ H_3\overset{+}{N}\text{---}\overset{|}{C}\text{---}COO^- \\ | \\ H \end{array}$$
L-configuration
I or $$\begin{array}{c} X \\ | \\ H_3\overset{+}{N}\text{---}\overset{|}{C}\text{---}COO^- \\ | \\ H \end{array}$$
D-configuration
Ia wherein X is the amino acid side-group determinant, said process consisting essentially of the nucleophilic ring-opening of 3-amino-2-oxetanone salts of the formulas II and IIa, respectively:

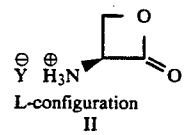
L-configuration
II or

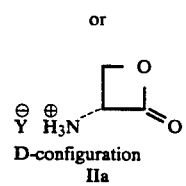
D-configuration
IIa wherein Y is a suitable salt anion, said nucleophilic ring-opening occurring by reacting said 3-amino-2-oxetanone with a nucleophilic reagent bearing said amino acid side-group determinant X, said nucleophilic reagent being an anion selected from the group consisting of cyanide, malonate, hydrogen sulphide, thiosulfate, trifluoroacetate, hydrogen phosphate, phosphate, chloride and azide, or another nucleophile selected from the group consisting of cysteine, 2-amino-ethanethiol, dimethyl sulfide and pyrazole.

2. A process of claim 1 wherein said carbon nucleophile is selected from the group comprising cyanide and malonate anions.

3. A process of claim 1 wherein Y⁻ of said 3-amino-2-oxetanone salt is selected from the group comprising simple arylsulfonates, simple alkylsulfonates, trifluoromethane sulfonate, tetrafluoborate, and perchlorate.

4. A process of claim 1 wherein $Y^-$ of said 3-amino-2oxetanone salt is selected from the group comprising trifluoroacetate and toluenesulfonates.

5. A process of claim 1 for preparing L,L-Lanthionine from the L-configuration of the 3-amino-2-oxetanone salt wherein X is $-OOC(H_3N^+)CHCH_2S^-$ said nucleophilic reagent being L-cysteine.

6. A process of claim 1 for preparing D,D-Lanthione from the D-configuration of the 3-amino-2-oxetanone salt wherein X is $-OOC(H_3N^+)CHCH_2S^-$ said nucleophilic reagent being D-cysteine.

7. A process of claim 1 for preparing D,L-Lanthionine from the D-configuration of the 3-amino-2-oxetanone salt wherein X is $-OOC(H_3N^+)CHCH_2S^-$ said nucleophilic reagent being L-cysteine.

8. A process of claim 1 for preparing L,D-Lanthionine from the L-configuration of the 3-amino-2-oxetanone salt wherein X is $-OOC(H_3N^+)$ $CHCH_2S^-$ said nucleophilic reagent being D-cysteine.

9. A process of claim 1 for preparing L- or D-S-(Aminoethyl)cysteine hydrochloride wherein X is $H_2NCH_2CH_2S^-$ said nucleophilic reagent being 2-aminoethanethiol.

10. A process of claim 1 for preparing L- or D-cysteine wherein X is HS- said nucleophilic reagent being a hydrogen sulfide anion.

11. A process of claim 1 for preparing L- or D-S-Sulfocysteine, wherein X is $-O_3SS$ - said nucleophilic reagent being a thiosulfate anion.

12. A process of claim 1 for preparing L- or D-cysteine dimethylsulfonium bis(p-toluenesulfonic acid) salt wherein X is $Me_2S^+$- said nucleophilic reagent being $Me_2S$.

13. A process of claim 1 for preparing L- or D-O-trifluoroacetyl serine, wherein X is $CF_3COO-$ said nucleophilic reagent being trifluoroacetate anion.

14. A process of claim 1 for preparing L- or D-O-phosphoserine wherein X is $H_2PO_4-$ said nucleophilic reagent being a hydrogen phosphate anion.

15. A process of claim 1 for preparing L- or D-O-phosphoserine wherein X is $H_2PO_4-$ said nucleophilic reagent being a phosphate anion.

16. A process of claim 1 for preparing L- or D-$\beta$-chloroalanine wherein X is Cl- said nucleophilic reagent being a chloride anion.

17. A process of claim 1 for preparing L- or D-$\beta$-cyanoalanine wherein X is $N\equiv C-$ said nucleophilic reagent being a cyanide anion and said nucleophilic ring-opening being conducted in the presence of a polar aprotic solvent.

18. A process of claim 18 wherein said polar aprotic solvent is dimethylformamide.

19. A process of claim 1 for preparing L- or D-$\beta$-(pyrazol-1-yl)alanine wherein X is

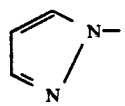

said nucleophilic reagent being pyrazole.

20. A process of claim 1 for preparing L- or D-$\beta$-azidoalanine wherein X is $N_3$- said nucleophilic reagent being an azide anion.

21. A process of claim 1 wherein 3-amino-2-oxetanone salts of formula II or IIA:

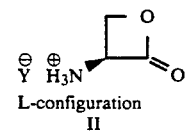

L-configuration
II or

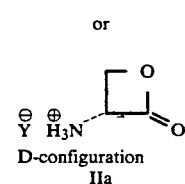

D-configuration
IIa wherein $Y^-$ is a suitable salt anion, are prepared by removing a protecting group from N-protected serine $\beta$-lactones of the formula III or IIIA:

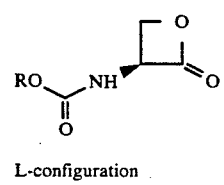

L-configuration or

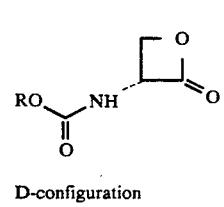

D-configuration wherein R is a suitable protecting group, said deprotection occurring in the presence of a suitable acid of the formula HY capable of deprotecting a compound of Formula III or IIIa.

22. A process of claim 21 wherein said acid is selected from the group comprising simple alkylsulfonic acids, simple arylsulfonic acids, trifluoromethanesulfonic acid, perchloric acid, and tetrafluoboric acid.

23. A process of claim 21 wherein said acid is selected from the group comprising trifluoroacetic acid and toluenesulfonic acids.

24. A process of claim 21 wherein R is tert-butyl.

25. A process of claim 21 wherein R is selected from the group comprising adamantyl, 4-methoxybenzyl, 2-(3,5-dimethoxyphenyl)-2-propyl, and 2-(4-biphenyl)-2-propyl.

26. A process of claim 21 wherein $Y^-$ of said 3-amino-2-oxetanone salt is selected from the group comprising arylsulfonates, alkylsulfonates, trifluoromethane sulfonate, tetrafluoborate, and perchlorate.

27. A process of claim 21 wherein $Y^-$ of said 3-amino-2-oxetanone salt is selected from the group comprising trifluoroacetate and toluenesulfonates.

28. A process of claim 21 wherein R of Formulas III and IIIa respectively is benzyl and deprotection to Formulas II and IIa respectively is effected by hydrogenation in the presence of a suitable acid of Formula HY.

29. A process of claim 28 wherein said acid is selected from the group comprising simple alkylsulfonic acids, simple arylsulfonic acids, trifluoromethanesulfonic acid, perchloric acid, and tetrafluoboric acid.

30. A process of claim 28 wherein said acid is selected from the group comprising trifluoroacetic acid and toluenesulfonic acids.

31. A process of claim 1 wherein 3-amino-2-oxetanone salts of Formulas II and IIa, respectively are prepared by removing a protecting group from N-protected serine β-lactones of Formulas IV and IVa, respectively:

L-configuration

OR

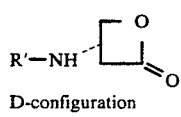

D-configuration wherein R' is a suitable acid-labile protecting group selected from the group consisting of N-triphenylmethyl, bis(4-methoxyphenyl)methyl, bis(4-methoxyphenyl)phenylmethyl, arylmethyls, trialkylmethyls and 2-nitrophenylsulfenyl, said deprotection occurring in the presence of a suitable acid of formula HY.

32. A process of claim 31 wherein said acid is selected from the group comprising simple alkylsulfonic acids, simple arylsulfonic acids, trifluoromethanesulfonic acid, perchloric acid and tetrafluoboric acid.

33. A process of claim 31 wherein said acid is selected from the group comprising trifluoroacetic acid and toluenesulfonic acids.

34. 3-Amino-2-oxetanone salts of the formulas:

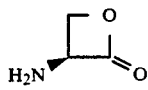

L-configuration or

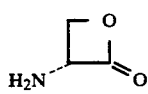

D-configuration 35. 3-Amino-2-oxetanone salts of the formula

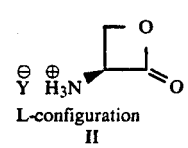

L-configuration
II or

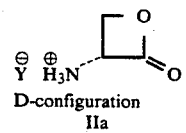

D-configuration
IIa wherein Y⁻ is a suitable salt anion.

36. 3-amino-2-oxetanone salts of claim 34 wherein Y⁻ is selected from the group consisting of arylsulfonates, alkylsulfonates, trifluormethane sulfonate, tetrafluoborate, and perchlorate.

37. 3-amino-2-oxetanone salts of claim 34 where Y⁻ is selected from the group consisting of trifluoroacetate and toluenesulfonates.

38. 3-amino-2-oxetanone trifluoroacetate of the formula

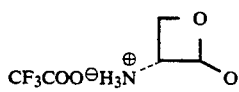

L-configuration

OR

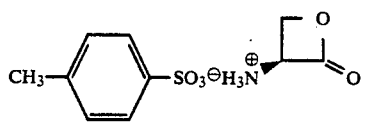

D-configuration 39. 3-amino-2-oxetanone tosylate of the formula

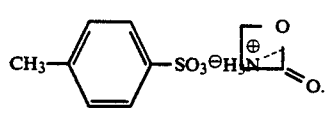

L-configuration

OR

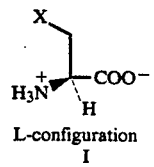

D-configuration

40. A process for the preparation of optically pure, free alpha-amino acids of the formulas I and Ia, respectively:

L-configuration
I or

-continued

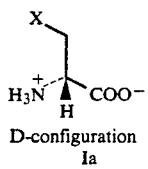
D-configuration
Ia wherein X is the amino acid side-group determinant, said process consisting essentially of the nucleophilic ring-opening of 3-amino-2-oxetanone salts of the formulas II and IIa, respectively:

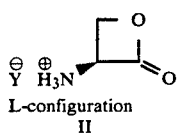
L-configuration
II or

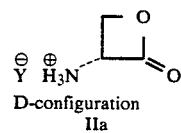
D-configuration
IIa wherein Y is a suitable salt anion, wherein a nucleophilic reagent bearing said amino acid side-group determinant X reacts with said 3-amino-2-oxetanone to add said amino acid side-group determinant X to the β-carbon of said 3-amino-2-oxetanone while opening the oxetanone ring, to form a free alpha-amino acid of formula I or Ia, said nucleophilic reagent being selected from the group consisting of oxygen nucleophiles, nitrogen nucleophiles, sulphur nucleophiles, phosphorous nucleophiles, halogen nucleophiles, other heteroatom nucleophiles and carbon nucleophiles.

* * * * *

UNITED STATES PATENT AND TRADEMARK OFFICE
CERTIFICATE OF CORRECTION

PATENT NO.   : 5,200,526
DATED        : April 6, 1993
INVENTOR(S)  : Lee D. Arnold, John C. Vederas It is certified that error appears in the above-indentified patent and that said Letters Patent is hereby corrected as shown below:

Column 17, line 54, please change "18" to --17--.

Column 20, lines 50-55, please correct the Figure as shown below:

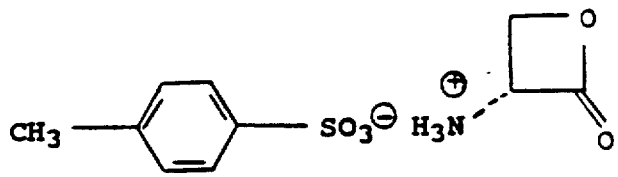

D-configuration    VIIa

Signed and Sealed this

Thirtieth Day of May, 1995

Attest:

BRUCE LEHMAN

Attesting Officer

Commissioner of Patents and Trademarks